(12) United States Patent
Dauth et al.

(10) Patent No.: US 6,437,015 B2
(45) Date of Patent: *Aug. 20, 2002

(54) RADIATION-CURING COMPOSITIONS

(75) Inventors: Jochen Dauth, Burghausen; Christian Herzig, Waging am See; Josef Wolferseder, Tann; Oliver Zoellner, Simbach am Inn, all of (DE)

(73) Assignee: Wacker-Chemie GmbH, Munich (DE)

( * ) Notice: Subject to any disclaimer, the term of this patent is extended or adjusted under 35 U.S.C. 154(b) by 0 days.

This patent is subject to a terminal disclaimer.

(21) Appl. No.: 09/775,767

(22) Filed: Feb. 2, 2001

Related U.S. Application Data

(63) Continuation of application No. 09/319,905, filed on Aug. 20, 1999, now abandoned.

(30) Foreign Application Priority Data

Dec. 16, 1996 (DE) .......................... 196 52 304
May 15, 1997 (DE) .......................... 197 20 472

(51) Int. Cl.$^7$ ................................. C08J 3/28
(52) U.S. Cl. .................. 522/99; 427/515; 556/437; 556/445; 556/440; 525/477; 525/479; 528/32; 528/26; 528/12
(58) Field of Search .............. 427/515; 556/437, 556/445, 440; 522/99; 525/477, 479; 528/32, 26, 12

(56) References Cited

U.S. PATENT DOCUMENTS

| | | |
|---|---|---|
| 5,034,491 A | 7/1991 | Wewers et al. |
| 5,113,006 A | 5/1992 | Herzig |
| 5,214,077 A * | 5/1993 | Herzig et al. |
| 5,250,647 A | 10/1993 | Herzig |
| 5,446,119 A | 8/1995 | Herzig et al. |
| 5,593,787 A | 1/1997 | Dauth et al. |

FOREIGN PATENT DOCUMENTS

| | | |
|---|---|---|
| DE | 43 25 359 A1 | 2/1995 |
| DE | 44 43 749 A1 | 6/1996 |
| EP | 0 424 960 A2 | 5/1991 |
| EP | 0 503 668 A2 | 9/1992 |
| EP | 0 508 491 A1 | 10/1992 |
| EP | 0 624 627 A2 | 11/1994 |
| WO | 95 26 266 A1 | 10/1995 |

OTHER PUBLICATIONS

Patent Abstracts Of Japan, vol. 107, No. 236 (C–1057) May 13, 1993 & JP 04 366 102 A (Sekisui Chem Co., Ltd.) Dec. 18, 1992.

Chemical Abstracts, vol. 119, No. 20, Nov. 15, 1993 Columbus, Ohio, US; Abstract No. 204095.

International Search Report—Jun. 6, 2000.

\* cited by examiner

Primary Examiner—Robert Dawson
Assistant Examiner—Kuo-Liang Peng
(74) Attorney, Agent, or Firm—Brooks & Kushman P.C.

(57) ABSTRACT

Radiation-curable compositions containing linear organopolysiloxanes bearing (meth)acryloxy groups and a photosensitizer are useful for release coatings particularly release coatings with enhanced adhesion to the substrate onto which they are coated, for example those used for adhesives such as pressure sensitive adhesive labels.

13 Claims, No Drawings

RADIATION-CURING COMPOSITIONS

This is a continuation of application Ser. No. 09/319,905 filed on Aug. 20, 1999, now abandoned, which is a national stage entry of PCT/EP97/06922 filed on Dec. 11, 1997.

The invention relates to radiation-curing compositions comprising

TECHNICAL FIELD (A) organopolysiloxanes containing (meth)acryloxy groups, and
(B) photosensitizers,
and to their use for preparing coatings which repel tacky substances.

DESCRIPTION OF THE RELATED ART

EP-A 624 627 (Shin-Etsu Chemical Co., Ltd; published on Nov. 17, 1994) describes radiation-curing organopolysiloxane mixtures which comprise ω-(meth)acryloxyalkyl groups. The organopolysiloxanes present in the mixtures are branched, with the branching sites representing trifunctional monoorganosiloxy groups, known as T units.

U.S. Pat. No. 5,034,419 (Th. Goldschmidt; published on Jul. 23, 1991) describes (meth)acrylate-modified organopolysiloxane mixtures for preparing abhesive coating materials, where two organopolysiloxanes differing in chain length are mixed in different proportions by weight.

WO95/26266 (Mobil Oil Corporation; published on Oct. 5, 1995) describes abhesive coating materials comprising added monomeric or oligomeric organic acrylate esters.

DE-A 44 43 749 (Wacker Chemie GmbH; published on Jun. 13, 1996) discloses organopolysiloxanes containing (meth)acryloxy groups.

SUMMARY OF THE INVENTION

One object was to provide novel compositions based on organopolysiloxanes containing (meth)acryloxy groups which undergo free-radical crosslinking by irradiation, preferably with light. Another object was to provide novel compositions for the preparation of coatings which repel tacky substances. A further object was to provide abhesive coating compositions which give abrasion-resistant coatings, i.e. which adhere to the substrate so that they cannot be separated from the substrate by mechanical influences, for example by rubbing, in order that they are not partially detached, and so reduce the adhesive force of the labels, when carriers located on them which are provided with adhesive, such as labels, for example, are peeled off. Yet another object was to provide abhesive coating compositions which give tack-free, thoroughly cured coatings. These objects are achieved by the invention.

DETAILED DESCRIPTION OF THE INVENTION

The invention provides radiation-curing compositions comprising
(A) linear organopolysiloxanes containing (meth)acryloxy groups, of the general formula $$R^1{}_aR_{3-a}SiO(R_2SiO)_d[R_2Si-Y-SiR_2O(R_2SiO)_c]_dSiR_{3-b}R^1{}_b \quad (I)$$

in which R can be identical or different and is a monovalent, substituted or unsubstituted hydrocarbon radical having 1 to 18 carbon atoms per radical, which is free from terminal aliphatic carbon—carbon multiple bonds, $R^1$ is a radical of the formula

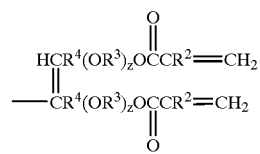

where z is an integer whose value is from 1 to 10,
$R^2$ is a hydrogen atom or a methyl radical,
$R^3$ is a linear or branched alkylene radical having 1 to 6 carbon atom(s) per radical, and
$R^4$ is a linear or branched alkylene radical having 1 to 6 carbon atom(s) per radical,
Y is a divalent organic radical which is free from terminal aliphatic carbon—carbon multiple bonds,
a is 0 or 1,
b is 0 or 1,
with the proviso that the sum a+b per molecule is 1 or 2, on average from 1.3 to 1.9,
c is an integer whose value is from 1 to 1000, and
d is 0 or an integer whose value is from 1 to 10, and
(B) photosensitizers.

The invention additionally provides a process for preparing coatings which repel tacky substances by applying crosslinkable compositions comprising
(A) linear organopolysiloxanes containing (meth)acryloxy groups, of the general formula $$R^1{}_aR_{3-a}SiO(R_2SiO)_d[R_2Si-Y-SiR_2O(R_2SiO)_c]_dSiR_{3-b}R^1{}_b \quad (I)$$

where R, $R^1$, Y, a, b, c and d are as defined above,
with the proviso that the sum a+b per molecule is 1 or 2, on average from 1.3 to 1.9, and
(B) photosensitizers
to the surfaces which are to be made repellent to tacky substances, and then curing the crosslinkable composition by irradiation.

The invention also provides linear organopolysiloxanes containing (meth)acryloxy groups, of the general formula $$R^1{}_aR_{3-a}SiO(R_2SiO)_d[R_2Si-Y-SiR_2O(R_2SiO)_c]_dSiR_{3-b}R^1{}_b \quad (I)$$

where R, $R^1$, Y, a, b, c and d are as defined above,
with the proviso that the sum a+b per molecule is 1 or 2, on average from 1.3 to 1.9.

The invention also provides organopolysiloxanes containing Si-bonded hydrogen atoms, of the general formula $$H_aR_{3-a}SiO(R_2SiO)_d[R_2Si-Y-SiR_2O(R_2SiO)_c]_dSiR_{3-b}H_b \quad (II)$$

where R, Y, a, b, c and d are as defined above,
with the proviso that the sum a+b per molecule is 1 or 2, on average from 1.3 to 1.9.

The novel organopolysiloxanes (A) preferably have a viscosity of from 20 to 20,000 mm²/s at 25° C., particularly preferably from 20 to 1000 mm²/s at 25° C. and, with very particular preference, from 20 to 500 mm²/s at 25° C.

The novel organopolysiloxanes preferably have iodine numbers of between 1 and 60, preferably between 4 and 40, the iodine number indicating the amount of iodine, in grams per 100 grams of novel organopolysiloxane employed, which is consumed during addition onto the double bond.

Examples of the radical R are in each case alkyl radicals, such as the methyl, ethyl, n-propyl, isopropyl, n-butyl, isobutyl, tert-butyl, n-pentyl, isopentyl, neopentyl, and the tert-pentyl radical, hexyl radicals, such as the n-hexyl radical, heptyl radicals, such as the n-heptyl radical, octyl radicals, such as the n-octyl radical and isooctyl radicals, such as the 2,2,4-trimethylpentyl and the 2-ethylhexyl radical, nonyl radicals, such as the n-nonyl radical, decyl radicals, such as the n-decyl radical, dodecyl radicals, such as the n-dodecyl radical, tetradecyl radicals, such as the n-tetradecyl radical, hexdecyl radicals, such as the n-hexadecyl radical, and octadecyl radicals, such as the n-octadecyl radical, cylcoalkyl radicals, such as cyclopentyl, cyclohexyl and 4-ethylcyclohexyl radical, cycloheptyl radicals, norbornyl radicals and methylcyclohexyl radicals, aryl radicals, such as the phenyl, biphenyl [sic], naphthyl and anthryl and phenanthryl radical; alkaryl radicals, such as o-, m-, p-tolyl radicals, xylyl radicals and ethylphenyl radicals; aralkyl radicals, such as the benzyl radical, and also the α- and the β-phenylethyl radical. The radical R is preferably the methyl radical.

Examples of substituted radicals R are haloalkyl radicals, such as the 3,3,3-trifluoro-n-propyl radical, the 2,2,2,2′,2′,2′-hexafluoroisopropyl radical and the heptafluoroisopropyl radical, haloaryl radicals, such as the o-, m- and p-chlorophenyl radical, and alkyl radicals which are substituted by an ether oxygen atom, such as the 2-methoxyethyl and the 2-ethoxyethyl radical.

The radical $R^2$ is preferably a hydrogen atom.

Examples of radicals $R^3$ are alkylene radicals of the formula $-CH_2-CH_2-$, $-CH_2-CH_2-CH_2-$, $-C(CH_3)HCH_2-$ and $-(CH_2)_4-$. $R^3$ is preferably a radical of the formula $-CH_2-CH_2-$.

Examples of alkylene radicals $R^4$ are those of the formula $-CH_2-$, $-CH(CH_3)-$, $-C(CH_3)_2-$, $-C(CH_3)(C_2H_5)-$, $-(CH_2)_2-$ and $-(CH_2)_4-$, preference being given to the radical of the formula $-CH_2-$.

Examples of radicals $R^1$ are those of the formula

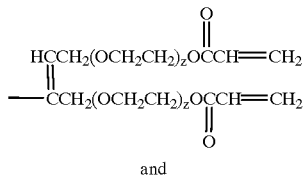

and

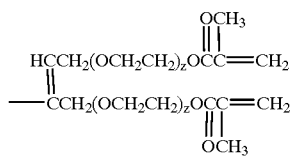

where z is as defined above and is preferably an integer having a value from 2 to 8.

Y is preferably a divalent hydrocarbon radical which can be interrupted by one or more oxygen atoms. Examples of radicals Y are those of the formula $-CH_2CH_2-$, $-CH(CH_3)-$, $-(CH_2)_4-$, $-(CH_2)_5-$, $-(CH_2)_6-$, $-(CH_2)_8-$, $-(CH_2)_{10}-$, $-(CH_2)_{12}-$, $-(CH_2)_3O(CH_2)_3-$, 1,3-$(CH_2CH_2)_2(C_6H_4)$, 1,4-$(CH_2CH_2)_2(C_6H_4)$, 1,3-$(CH_2CHCH_3)_2(C_6H_4)$ and 1,4-$(CH_2CHCH_3)_2(C_6H_4)$, preference being given to the radicals of the formula $-CH_2CH_2-$, $-CH(CH_3)-$, $-(CH_2)_6-$, $-(CH_2)_8-$, 1,3-$(CH_2CH_2)_2(C_6H_4)$, 1,4-$(CH_2CH_2)_2(C_6H_4)$, 1,3-$(CH_2CHCH_3)_2(C_6H_4)$ and 1,4-$(CH_2CHCH_3)_2(C_6H_4)$ and particular preference to the radical of the formula $-CH_2CH_2-$.

The sum a+b is preferably on average from 1.4 to 1.9.

As end groups the organopolysiloxanes (A) contain on average from 65 to 95 mol-% of radicals $R^1$ (or, respectively, from 35 to 5 mol-% of radicals R, preferably methyl end groups), corresponding to an average sum a+b of from 1.3 to 1.9. In the case of the novel compositions it is preferred to employ a mixture of different organopolysiloxanes (A).

Preferably, c is an integer whose value is from 10 to 300, more preferably from 15 to 150.

Preferably, d is 0 or an integer whose value is from 1 to 3; d is more preferably 0.

The novel, linear organopolysiloxanes containing (meth)acryloxy groups are preferably prepared by reacting alkoxylated alk-2-yne 1,4-di(meth)acrylates (1) of the general formula

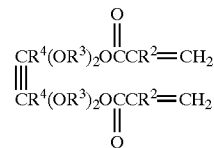

where $R^2$, $R^3$, $R^4$ and z are as defined above, with organopolysiloxanes (2) containing Si-bonded hydrogen atoms, of the general formula $$H_aR_{3-a}SiO(R_2SiO)_d[R_2Si-Y-SiR_2O(R_2SiO)_c]_dSiR_{3-b}H_b \quad (II)$$

where R, Y, a, b, c and d are as defined above, in the presence of catalysts (3) which promote the addition of Si-bonded hydrogen onto aliphatic multiple bond and in the presence of polymerization inhibitors (4), with the proviso that alkoxylated alk-2-yne 1,4-di(meth)acrylates (1) are employed in amounts of from 1.01 to 1.5 mol, preferably from 1.01 to 1.2 mol, per gram atom of Si-bonded hydrogen in organopolysiloxanes (2).

Alkoxylated alk-2-yne 1,4-di(meth)acrylates (1) can be prepared by general methods from the prior art; in such methods, the alkoxylated alkynediol, for example ethoxylated but-2-yne-1,4-diol, is esterified with acrylic acid under acidic catalysis. The water of reaction is removed azeotropically.

Catalysts (3) which promote the addition of Si-bonded hydrogen onto aliphatic multiple bond, known as hydrosilylation catalysts, are familiar to the skilled worker, and examples thereof, and also the amounts of catalysts employed, are described in DE-A 44 43 749.

As polymerization inhibitor (4) it is preferred to employ phenolic stabilizers, such as cresol derivatives or hydroquinone derivatives, for example bis(tert-butyl)cresol, 2,5-di-tert-butylhydroquinone or the monomethyl ether of hydroquinone, or phenothiazine, in a concentration of from 0.001 to 1% by weight, preferably from 0.002 to 0.5% by weight, based on the overall weight of alkoxylated alkyne diacrylate (1) and organopolysiloxane (2).

Preference is given to organopolysiloxanes, containing (meth)acryloxy groups, of the formula (I) where d is 0. In preparing these organopolysiloxanes of the formula (I) where d is 0, it is preferred to employ organopolysiloxanes, containing Si-bonded hydrogen atoms, of the formula (II) where d is 0. A preferred process for preparing the organopolysiloxanes of the formula (II) where d is 0 is the acid-catalysed equilibration of polydialkylsiloxanes having alkyl end groups with polydialkylsiloxanes having terminal Si-bonded hydrogen atoms.

The novel organopolysiloxanes containing (meth)acryloxy groups are preferably crosslinked by light, more preferably by ultraviolet light, with preference being given to that having wavelengths in the range from 200 to 400 nm. The ultraviolet light can be generated, for example, in xenon lamps, in low-, medium- or high-pressure mercury lamps or in excimer lamps. Also suitable for photocrosslinking is light having a wavelength of from 400 to 600 nm, i.e. so-called halogen light.

Alternatively, the energy sources suitable for crosslinking the novel organopolysiloxanes can be X-rays, gamma rays or electron beams or can involve the simultaneous use of at least two different kinds of such radiations. In addition to the high-energy radiation it is also possible to employ a supply of heat, including heat supplied by means of infrared light. Supplying such heat is, however, in no way necessary and is preferably omitted in order to reduce the energy cost.

Suitable photosensitizers (B) are substituted or unsubstituted acetophenones, propiophenones, benzophenones, anthraquinones, benzils, carbazoles, xanthones, thioxanthones, fluorenes, fluorenones, benzoins, naphthalenesulfonic acids, benzaldehydes and cinnamic acids.

Examples of photosensitizers (B) are fluorenone, fluorene, carbazole; acetophenone; substituted acetophenones such as 3-methylacetophenone, 2,2'-dimethoxy-2-phenylacetophenone, 4-methylacetophenone, 3-bromoacetophenone, 4-allylacetophenone, p-diacetylbenzene, p-tert-butyltrichloroacetophenone; propiophenone; substituted propiophenones such as 1-[4-(methylthio)phenyl]-2-morpholinylpropan-1-one, benzophenone; substituted benzophenones such as Michler's ketone, 3-methoxybenzophenone, 4,4'-dimethylaminobenzophenone, 4-methylbenzophenone, 4-chlorobenzophenone, 4,4'-dimethoxybenzophenone, 4-chloro-4'-benzylbenzophenone; xanthone; substituted xanthone such as 3-chloroxanthone, 3,9-dichloroxanthone, 3-chloro-8-nonylxanthone; thioxanthone, substituted thioxanthones such as isopropylthioxanthones; anthraquinone; substituted anthraquinones such as chloroanthraquinone and anthraquinone-1,5-disulfonic acid disodium salt; benzoin; substituted benzoins, such as benzoin methyl ether; benzil; 2-naphthalenesulfonyl chloride; benzaldehyde; cinnamic acid; and oligo[2-hydroxy-2-methyl-1-(4-(1-methylvinyl)phenyl)propanone].

Photosensitizers (B) are employed in the novel compositions in amounts of preferably from 0.01 to 10% by weight, more preferably from 0.5 to 5 percent by weight, based in each case on the overall weight of the organopolysiloxanes (A) to be crosslinked.

The preferred photosensitizer (B) used is oligo[2-hydroxy-2-methyl-1-(4-(1-methylvinyl)phenyl)propanone], obtainable commercially under the trade name "ESACURE-KIP 150" from Lamberti. In this context, the oligomeric photosensitizer is preferably dissolved in a short-chain organopolysiloxane.

Particular preference is given to mixtures comprising
from 10 to 40% by weight, in particular 20% by weight, of oligo[2-hydroxy-2-methyl-1-(4-(1-methylvinyl)phenyl) propanone]and
from 90 to 60% by weight, in particular 80% by weight, of an organopolysiloxane containing (meth)acryloxy groups, of the general formula

$$R^1R_2SiO(R_2SiO)_nSiR_2R^1 \quad (III)$$

where R and $R^1$ are as defined above and n is an integer from 5 to 30, in particular 13, for use as photosensitizer.

The photosensitizer mixture is employed in the novel radiation-curing compositions preferably in amounts of from 5 to 30% by weight, based on the component (A).

The use of the photosensitizer mixture in the novel radiation-curing compositions has the advantage that the formation of benzaldehyde as an elimination product in the course of curing is avoided and that substrate adhesion and the abrasion resistance of the coatings are improved.

The novel compositions may comprise polymerization inhibitors. For reasons of better handling it is preferred to add small amounts of inhibitors (C) to the novel compositions in order, for example, to prevent premature crosslinking of a servicable formulation in the course of its storage. Examples of inhibitors which may be employed are all customary inhibitors which have also been employed to date in free-radical processes, such as hydroquinone, 4-methoxyphenol, 2,6-di-tert-butyl-4-methylphenol or phenothiazine. Inhibitors are preferably employed in amounts of from 10 to 10,000 ppm, particularly preferably from 50 to 1000 ppm, based in each case on the overall weight of the organopolysiloxanes (A) to be crosslinked.

If desired, it is possible in addition to add monomeric or oligomeric, organic (meth)acrylate esters or mixtures thereof in an amount of preferably from 0.1 to 10 percent by weight, based on the overall weight of the organopolysiloxanes (A) to be crosslinked, but this is not preferred.

Examples of surfaces to which the novel coatings can be applied are those of paper, wood, cork, polymer films, for example polyethylene films or polypropylene films, ceramic articles, glass, including glass fibers, metals, boards, including those of asbestos, and woven and nonwoven textile comprising natural or synthetic organic fibers. The novel coatings are used, for example, in the coating of release papers.

The application of the novel, photocrosslinkable compositions to the surfaces that are to be coated can be made by any of the appropriate and widely known methods of preparing coatings from liquid materials, for example by dipping, spreading, flowcoating, spraying, rolling, printing, by means for example of an offset gravure coating device, or by blade or knife coating.

The novel radiation-curing coatings have the advantage that with respect to numerous tacky substances there is no zippy release. A further advantage is that the novel compositions possess low viscosities and do not give rise to any misting problems even under high friction. The novel compositions exhibit good flow on numerous substrates. Furthermore, there is the advantage that, owing to the specifically adjustable functional densities, a variety of graduations in release force can be established and the compositions are readily blendable with one another.

Preparing the Organopolysiloxanes (A):

a) 80 g of an α,ω-dihydridodimethylpolysiloxane (content of Si-bonded hydrogen: 0.346% by weight) having a viscosity of 3.7 $mm^2$/s at 25° C. and 423.9 g of a methyl-terminated polydimethylsiloxane with a mean chain length of about 390 siloxy units and a viscosity of 5000 $mm^2$/s at 25° C. are equilibrated with $PNCl_2$ catalysis (40 ppm) at 140° C. under nitrogen and with stirring for two hours. After cooling to 70° C., 5.2 g of magnesium oxide are added to the reaction mixture, which is finally brought to room temperature with stirring. After filtration, the product is heated to constant weight over forty minutes at 120° C. under a high vacuum (1 mbar). This gives 474.5 g (92.5% of theory) of a clear, colorless oil having a viscosity of 69 $mm^2$/s at 25° C. and a content of Si-bonded hydrogen of 0.044% by weight (VSI). The polymer contains on average 88 mol-% of hydridodimethylsiloxy groups.

20 g of VSI, 4.04 g of an ethoxylated butynediol diacrylate having a molecular weight of about 440 g/mol (9.2 mmol of C=C), 300 ppm of hydroquinone monomethyl ether based on the mass of diacrylate and 16 g of toluene are thermally conditioned to 120° C. with stirring. Then 48.1 mg of a 1% strength by weight (based on elemental platinum) solution, in toluene, of a tris (divinyltetramethyldisiloxane)diplatinum complex are added and the reaction mixture is stirred at 120° C. for twenty minutes. After filtration, the product is heated to constant weight for fifteen minutes at 100° C. under a high vacuum (1 mbar). This gives 23.6 g (98% of theory) of a clear, yellow oil having a viscosity of 290 mm$^2$/s at 25° C. and an iodine number of 18.7 g of iodine per 100 g of oil.

b) 50 g of an α,ω-dihydridodimethylpolysiloxane (content of Si-bonded hydrogen: 0.346% by weight) having a viscosity of 3.7 mm$^2$/s at 25° C. and 429.3 g of a methyl-terminated polydimethylsiloxane with a mean chain length of about 390 siloxy units and a viscosity of 5000 mm$^2$/s at 25° C. are equilibrated with PNCl$_2$ catalysis (40 ppm) at 140° C. under nitrogen and with stirring for two hours. After cooling to 70° C., 4.8 g of magnesium oxide are added to the reaction mixture, which is finally brought to room temperature with stirring. After filtration, the product is heated to constant weight over forty minutes at 120° C. under a high vacuum (1 mbar). This gives 451.5 g (94.2% of theory) of a clear, colorless oil having a viscosity of 179 mm$^2$/s at 25° C. and a content of Si-bonded hydrogen of 0.028% by weight (VSII). The polymer contains on average 82 mol-% of hydridodimethylsiloxy groups.

20 g of VSII, 2.57 g of an ethoxylated butynediol diacrylate having a molecular weight of about 440 g/mol (5.9 mmol of C=C), 300 ppm of hydroquinone monomethyl ether based on the mass of diacrylate and 10 g of toluene are thermally conditioned to 120° C. with stirring. Then 45.1 mg of a 1% strength by weight (based on elemental platinum) solution, in toluene, of a tris (divinyltetramethyldisiloxane)diplatinum complex are added and the reaction mixture is stirred at 120° C. for twenty minutes. After filtration, the product is heated to constant weight for fifteen minutes at 100° C. under a high vacuum (1 mbar). This gives 21.8 g (97% of theory) of a clear, yellow oil having a viscosity of 520 mm$^2$/s at 25° C. and an iodine number of 12.5 g of iodine per 100 g of oil.

c) 400 g of an α,ω-dihydridodimethylpolysiloxane (content of Si-bonded hydrogen: 0.049% by weight) having a viscosity of 53 mm$^2$/s at 25° C. and 100 g of a methyl-terminated polydimethylsiloxane with a mean chain length of about 120 siloxy units and a viscosity of 250 mm$^2$/s at 25° C. are equilibrated with PNCl$_2$ catalysis (40 ppm) at 140° C. under nitrogen and with stirring for two hours. After cooling to 70° C., 5 g of magnesium oxide are added to the reaction mixture, which is finally brought to room temperature with stirring. After filtration, the product is heated to constant weight over forty minutes at 120° C. under a high vacuum (1 mbar). This gives 420 g (84% of theory) of a clear, colorless oil having a viscosity of 73 mm$^2$/s at 25° C. and a content of Si-bonded hydrogen of 0.046% by weight (VSIII). The polymer contains on average 86 mol-% of hydridodimethylsiloxy groups.

20 g of VSIII, 4.19 g of an ethoxylated butynediol diacrylate having a molecular weight of about 440 g/mol (9.6 mmol of C=C), 300 ppm of hydroquinone monomethyl ether based on the mass of diacrylate and 16.8 g of toluene are thermally conditioned to 120° C. with stirring. Then 52.3 mg of a 1% strength by weight (based on elemental platinum) solution, in toluene, of a tris (divinyltetramethyldisiloxane)diplatinum complex are added and the reaction mixture is stirred at 120° C. for twenty minutes. After filtration, the product is heated to constant weight for fifteen minutes at 100° C. under a high vacuum (1 mbar). This gives 22.3 g (92% of theory) of a clear, yellow oil having a viscosity of 336 mm$^2$/s at 25° C. and an iodine number of 19.4 g of iodine per 100 g of oil.

d) 13.5 g of an α,ω-dihydridodimethylpolysiloxane (content of Si-bonded hydrogen: 0.310% by weight) having a viscosity of 3.7 mm$^2$/s at 25° C. and 86.5 g of a methyl-terminated polydimethylsiloxane with a mean chain length of about 103 siloxy units and a viscosity of 200 mm$^2$/s at 25° C. are equilibrated with PNCl$_2$ catalysis (40 ppm) at 140° C. under nitrogen and with stirring for two hours. After cooling to 70° C., 1.0 g of magnesium oxide are added to the reaction mixture, which is finally brought to room temperature with stirring. After filtration, the product is heated to constant weight over forty minutes at 120° C. under a high vacuum (1 mbar). This gives 91.7 g (91.7% of theory) of a clear, colorless oil having a viscosity of 37 mm$^2$/s at 25° C. and a content of Si-bonded hydrogen of 0.042% by weight (VSV). The polymer contains on average 65 mol-% of hydridodimethylsiloxy groups.

20 g of VSV, 3.88 g of an ethoxylated butynediol diacrylate having a molecular weight of about 440 g/mol (8.8 mmol of C=C), 300 ppm of hydroquinone monomethyl ether based on the mass of diacrylate and 7.76 g of toluene are thermally conditioned to 120° C. with stirring. Then 47.8 mg of a 1% strength by weight (based on elemental platinum) solution, in toluene, of a tris (divinyltetramethyldisiloxane)diplatinum complex are added and the reaction mixture is stirred at 120° C. for twenty minutes. After filtration, the product is heated to constant weight for fifteen minutes at 100° C. under a high vacuum (1 mbar). This gives 22.9 g (95.8% of theory) of a clear, yellow oil having a viscosity of 103 mm$^2$/s at 25° C. and an iodine number of 18.7 g of iodine per 100 g of oil.

e) 29.8 g of an α,ω-dihydridodimethylpolysiloxane (content of Si-bonded hydrogen: 0.310% by weight) having a viscosity of 3.7 mm$^2$/s at 25° C. and 70.2 g of a methyl-terminated polydimethylsiloxane with a mean chain length of about 390 siloxy units and a viscosity of 5000 mm$^2$/s at 25° C. are equilibrated with PNCl$_2$ catalysis (40 ppm) at 140° C. under nitrogen and with stirring for two hours. After cooling to 70° C., 1.0 g of magnesium oxide are added to the reaction mixture, which is finally brought to room temperature with stirring. After filtration, the product is heated to constant weight over forty minutes at 120° C. under a high vacuum (1 mbar). This gives 93.8 g (93.8% of theory) of a clear, colorless oil having a viscosity of 22.3 mm$^2$/s at 25° C. and a content of Si-bonded hydrogen of 0.092% by weight (VSVI). The polymer contains on average 95 mol-% of hydridodimethylsiloxy groups.

20 g of VSVI, 8.10 g of an ethoxylated butynediol diacrylate having a molecular weight of about 440 g/mol (18.4 mmol of C=C), 300 ppm of hydroquinone monomethyl ether based on the mass of diacrylate and 16.2 g of toluene are thermally conditioned to 120° C. with stirring. Then 56.2 mg of a 1% strength by weight (based on elemental platinum) solution, in toluene, of a tris (divinyltetramethyldisiloxane)diplatinum complex are added and the reaction mixture is stirred at 120° C. for twenty minutes. After filtration, the product is heated to constant weight for fifteen minutes at 100° C. under a high vacuum (1 mbar). This gives 26.2 g (93.4% of theory) of a clear, yellow oil having a viscosity of 67 mm²/s at 25° C. and an iodine number of 33.3 g of iodine per 100 g of oil.

f) Polymer AC I:

80 g of an α,ω-dihydridodimethylpolysiloxane (content of Si-bonded hydrogen: 0.346% by weight) having a viscosity of 3.7 mm²/s at 25° C. and 488.5 g of a methyl-terminated polydimethylsiloxane with a mean chain length of about 275 siloxy units and a viscosity of 2000 mm²/s at 25° C. are equilibrated with $PNCl_2$ catalysis (40 ppm) at 140° C. under nitrogen and with stirring for two hours. After cooling to 70° C., 5.7 g of magnesium oxide are added to the reaction mixture, which is finally brought to room temperature with stirring. After filtration, the product is heated to constant weight over forty minutes at 120° C. under a high vacuum (1 mbar). This gives 525 g (92.3% of theory) of a clear, colorless oil having a viscosity of 71 mm²/s at 25° C. and a content of Si-bonded hydrogen of 0.041% by weight (VSIV). The polymer contains on average 84 mol-% of hydridodimethylsiloxy groups.

20 g of VSIV, 3.77 g of an ethoxylated butynediol diacrylate having a molecular weight of about 440 g/mol (9.2 mmol of C=C), 300 ppm of hydroquinone monomethyl ether based on the mass of diacrylate and 15 g of toluene are thermally conditioned to 120° C. with stirring. Then 54.6 mg of a 1% strength by weight (based on elemental platinum) solution, in toluene, of a tris(divinyltetramethyldisiloxane)diplatinum complex are added and the reaction mixture is stirred at 120° C. for twenty minutes. After filtration, the product is heated to constant weight for fifteen minutes at 100° C. under a high vacuum (1 mbar). This gives 20.5 g (86% of theory) of a clear, yellow oil having a viscosity of 346 mm²/s at 25° C. and an iodine number of 17.8 g of iodine per 100 g of oil (AC I).

g) Comparison polymer AC II:

20 g of an α,ω-dihydridodimethylpolysiloxane having a content of Si-bonded hydrogen of 0.049% by weight ($0.97 \cdot 10^{-2}$ mol of SiH) and a viscosity of 67 mm²/s at 25° C., 4.47 g of an ethoxylated butynediol diacrylate having a molecular weight of about 440 g/mol ($1.02 \cdot 10^{-2}$ mol of C=C), 300 ppm of hydroquinone monomethyl ether, based on the mass of diacrylate, 17.9 g of toluene and 62.7 μl (20 ppm of platinum, based on pure metal) of a solution of hexachloroplatinic acid in isopropanol, having a platinum content of 1% by weight, are thermally conditioned at 110° C. with stirring in a reaction vessel. After a reaction period of 30 minutes at 110° C. the reaction mixture is filtered and the filtrate is concentrated to constant weight under a high vacuum at 100° C. This gives 20.3 g (83% of theory) of a clear, yellow oil having a viscosity of 320 mm²/s at 25° C. and an iodine number of 20.6 g of iodine per 100 g of oil (AC II).

EXAMPLE 1 AND COMPARISON EXPERIMENT 1

Polymer AC I and AC II, whose preparation has been described above under f) and g), respectively, are each admixed with 3% by weight of 2-hydroxy-2-methyl-1-phenolpropan-1-one (Darocur 1173, from Ciba-Geigy). The finished formulations are applied in a coating thickness of about 3 μm using a glass rod to the substrates specified in Table 1 and are cured at 30° C. for three seconds under a nitrogen atmosphere containing 20 ppm of residual oxygen and under a 300 series H lamp from Fusion. To determine the rub-off (abrasion) the coated substrates are stretched between thumb and forefinger. Then the finger of the other hand is used to rub rapidly backward and forward a number of times under vigorous pressure on the stretched substrate. If the adhesion of the silicone film to the substrate surface is poor, some of the silicone applied is abraded. The rub-off is given a rating of 1–6 in accordance with its extent, a completely undamaged surface receiving the rating 1.

TABLE 1

Comparison of rub-off values

| | Substrates | | | | |
|---|---|---|---|---|---|
| | Bosso N925 (from Bosso) | Polypropylene* (from UCB) | Treated silicone paper T 4377 (from Finnpap) | ChamTenero 841 (from Cham Tenero AG) | HDPE Q24000* (from 4 P Folie) |
| AC II | 4 | 5 | 2 | 5 | 3 |
| AC I | 2 | 3 | 1 | 3 | 1 |

*The abovementioned films were not corona-pretreated before coating.

As Table 1 clearly shows, the novel, cured silicone films with polymer AC I exhibit better adhesion and abrasion resistance on all substrates.

EXAMPLE 2

25 g of oligo[2-hydroxy-2-methyl-1-(4-(1-methylvinyl)phenyl)propanone] (obtainable commercially under the trade name "ESACURE KIP 150" from Lamberti) are thermally conditioned at 60° C. for one hour. Then 125 g of a short-chain α,ω-diacrylated dimethylpolysiloxane of the general formula

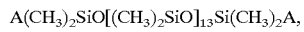

where A is a radical of the formula

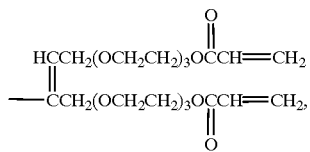

are metered in and the mixture is stirred vigorously for 30 minutes. A brown solution having a viscosity of 350 mm²/s at 25° C. is obtained (PI I).

Firstly 3% by weight of 2-hydroxy-2-methyl-1-phenylpropan-1-one (obtainable commercially under the trade name "Darocur 1173" from Ciba-Geigy) and 12% by weight of the above-described short-chain α,β-diacrylated dimethylpolysiloxane and secondly 15% by weight of PI I whose preparation has been described above are added to polymer AC I, whose preparation has been described above under f). The finished formulations are applied to the respective substrates and cured as described in Example 1. The rub-off (abrasion) and thus the assessment of the anchorage to the substrate are as described in Example 1. The results are summarized in Table 2.

TABLE 2

Rub-off values with different photoinitiators

| | Substrates | | | | |
|---|---|---|---|---|---|
| | Bosso N925 (from Bosso) | Polypropylene* (from UCB) | Treated silicone paper T 4377 (from Finnpap) | ChamTenero 841 (from Cham Tenero AG) | HDPE Q24000* (from 4 P Folie) |
| Darocure 1173 | 3 | 4 | 2 | 4 | 2 |
| PI I | 1 | 1 | 1 | 1 | 1 |

As Table 2 clearly shows, the novel cured silicone films with polymer AC I in conjunction with the novel oligomeric photoinitiator formulation PI I exhibit optimum adhesion and abrasion resistance on all substrates.

What is claimed is:

1. Linear organopolysilxanes containing (meth)acryloxy groups, of the general formula

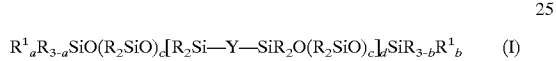

in which R can be identical or different and is a monovalent, substituted or unsubstituted hydrocarbon radical having 1 to 18 carbon atoms per radical, which is free from terminal aliphatic carbon—carbon multiple bonds, $R^1$ is a radical of the formula

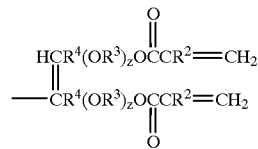

where z is an integer whose value is from 1 to 10, $R^2$ is a hydrogen atom or a methyl radical, $R^3$ is a linear or branched alkylene radical having 1 to 6 carbon atom(s) per radical, and $R^4$ is a linear or branched alkylene radical having 1 to 6 carbon atom(s) per radical, Y is a divalent organic radical which is free from terminal aliphatic carbon—carbon multiple bonds, a is 0 or 1, b is 0 or 1, c is 0 or an integer whose value is from 1 to 1000, d is 0 or an integer whose value is from 1 to 10, and with the proviso that the sum a+b per molecule is on average from 1.3 to 1.9.

2. A radiation curable composition, comprising:
a) a linear organopolysiloxane containing (meth)acryloxy groups of claim 1,
b) at least one photosensitizer.

3. The radiation curable composition of claim 2, wherein $R^1$ is

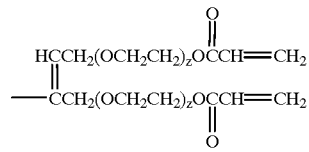

where z is an integer from 1 to 10.

4. The radiation curable composition of claim 2, wherein d is 0.

5. The radiation curable composition of claim 3, wherein d is 0.

6. A radiation curable composition as claimed in claim 2, wherein said photosensitizer comprises a photosensitizer mixture, comprising:
b)i) from 90% to 60% by weight based on the weight of the photosensitizer mixture of an organopolysiloxane containing (meth)acryloxy groups and having the formula

where n is an integer from 5 to 30; and
b)ii) from 40% to 10% by weight based on the weight of the photosensitizer mixture of oligo[2-hydroxy-2methyl-1-(4-(methylvinyl)phenyl) propanone].

7. The radiation curable mixture of claim 6, wherein $R^1$ is a radical of the formula

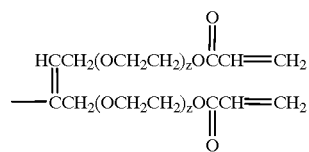

where z is an integer from 1 to 10.

8. The radiation curable composition of claim 2, wherein said photosensitizer comprises a photosensitizer mixture, comprising:
b)i) from 90% to 60% by weight based on the weight of the photosensitizer mixture, of an organopolysiloxane containing (meth)acryloxy groups and having the formula

where n is an integer from 5 to 30; and
b)ii) from 40% to 10% by weight based on the weight of the photosensitizer mixture, of oligo[2-hydroxy-2-methyl-1-(4-(methylvinyl)phenyl) propanone]
constitutes from 5% to 30% of the total weight of a).

9. The radiation curable composition of claim 3, wherein said photosensitizer comprises a photosensitizer mixture, comprising:
b)i) from 90% to 60% by weight based on the weight of the photosensitizer mixture, of an organopolysiloxane containing (meth)acryloxy groups and having the formula

where n is an integer from 5 to 30; and
b)ii) from 40% to 10% by weight based on the weight of the photosensitizer mixture, of oligo[2-hydroxy-2-methyl-1-(4-(methylvinyl)phenyl) propanone]

constitutes from 5% to 30% of the total weight of a).

10. The radiation curable composition of claim 4, wherein said photosensitizer comprises a photosensitizer mixture, comprising:
b)i) from 90% to 60% by weight based on the weight of the photosensitizer mixture, of an organopolysiloxane containing (meth)acryloxy groups and having the formula

where n is an integer from 5 to 30; and b)ii) from 40% to 10% by weight based on the weight of the photosensitizer mixture, of oligo[2-hydroxy-2-methyl-1-(4-(methylvinyl)phenyl) propanone] constitutes from 5% to 30% of the total weight of a).

11. The radiation curable composition of claim 5, wherein said photosensitizer comprises a photosensitizer mixture, comprising:
b)i) from 90% to 60% by weight based on the weight of the photosensitizer mixture, of an organopolysiloxane containing (meth)acryloxy groups and having the formula

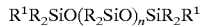

where n is an integer from 5 to 30; and b)ii) from 40% to 10% by weight based on the weight of the photosensitizer mixture, of oligo[2-hydroxy-2-methyl-1-(4-(methylvinyl)phenyl) propanone] constitutes from 5to 30% of the total weight of a).

12. The radiation curable mixture of claim 8 wherein $R^1$ is a radical of the formula

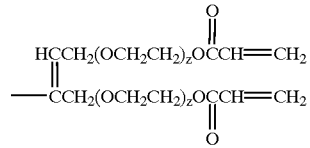

where z is an integer from 1 to 10.

13. The radiation curable mixture of claim 10 wherein $R^1$ is a radical of the formula

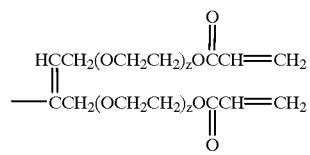

where z is an integer from 1 to 10.

* * * * *

UNITED STATES PATENT AND TRADEMARK OFFICE
CERTIFICATE OF CORRECTION

PATENT NO. : 6,437,015 B2 Page 1 of 1
DATED : August 20, 2002
INVENTOR(S) : Jochen Dauth et al.

It is certified that error appears in the above-identified patent and that said Letters Patent is hereby corrected as shown below:

Column 12,
Line 27, delete "2methyl" and insert therefor -- 2-methyl --.

Signed and Sealed this

Eleventh Day of February, 2003

JAMES E. ROGAN
*Director of the United States Patent and Trademark Office*